United States Patent
Teich

[15] 3,639,897
[45] Feb. 1, 1972

[54] VEHICLE HOLDUP AND THEFT ALARM

[72] Inventor: Rudor M. Teich, New York, N.Y.
[73] Assignee: Babaco Research, Inc., North Arlington, N.J.
[22] Filed: June 11, 1969
[21] Appl. No.: 832,363

[52] U.S. Cl. ............................................... 340/64, 340/274
[51] Int. Cl. ................................. B604 25/04, B60r 25/10
[58] Field of Search ............................. 340/64, 63, 213, 274

[56] References Cited

UNITED STATES PATENTS

| | | | |
|---|---|---|---|
| 1,568,509 | 1/1926 | Kolling et al. | 340/64 |
| 2,205,104 | 6/1940 | May | 340/64 |
| 2,650,354 | 8/1953 | Joiner, Jr. | 340/64 |
| 2,695,676 | 11/1954 | Wettengel | 340/64 |
| 3,209,326 | 9/1965 | Heiser | 340/63 |
| 3,541,505 | 11/1970 | Lee | 340/64 |

*Primary Examiner*—Donald J. Yusko
*Assistant Examiner*—Glen R. Swann, III
*Attorney*—James and Franklin

[57] ABSTRACT

An alarm system for a vehicle provides both theft and holdup prevention. When the vehicle is unattended any unauthorized attempt to open the cargo doors or to move the vehicle causes an alarm to be sounded and the motor to stall. An attempt at a holdup in which the cab door is opened while the driver is within the cab causes an alarm to sound and the motor to stall after a predetermined period of delay. The siren will continue to sound for at least a predetermined period even if the thief should gain possession of the alarm key and turn the alarm circuit off.

9 Claims, 3 Drawing Figures

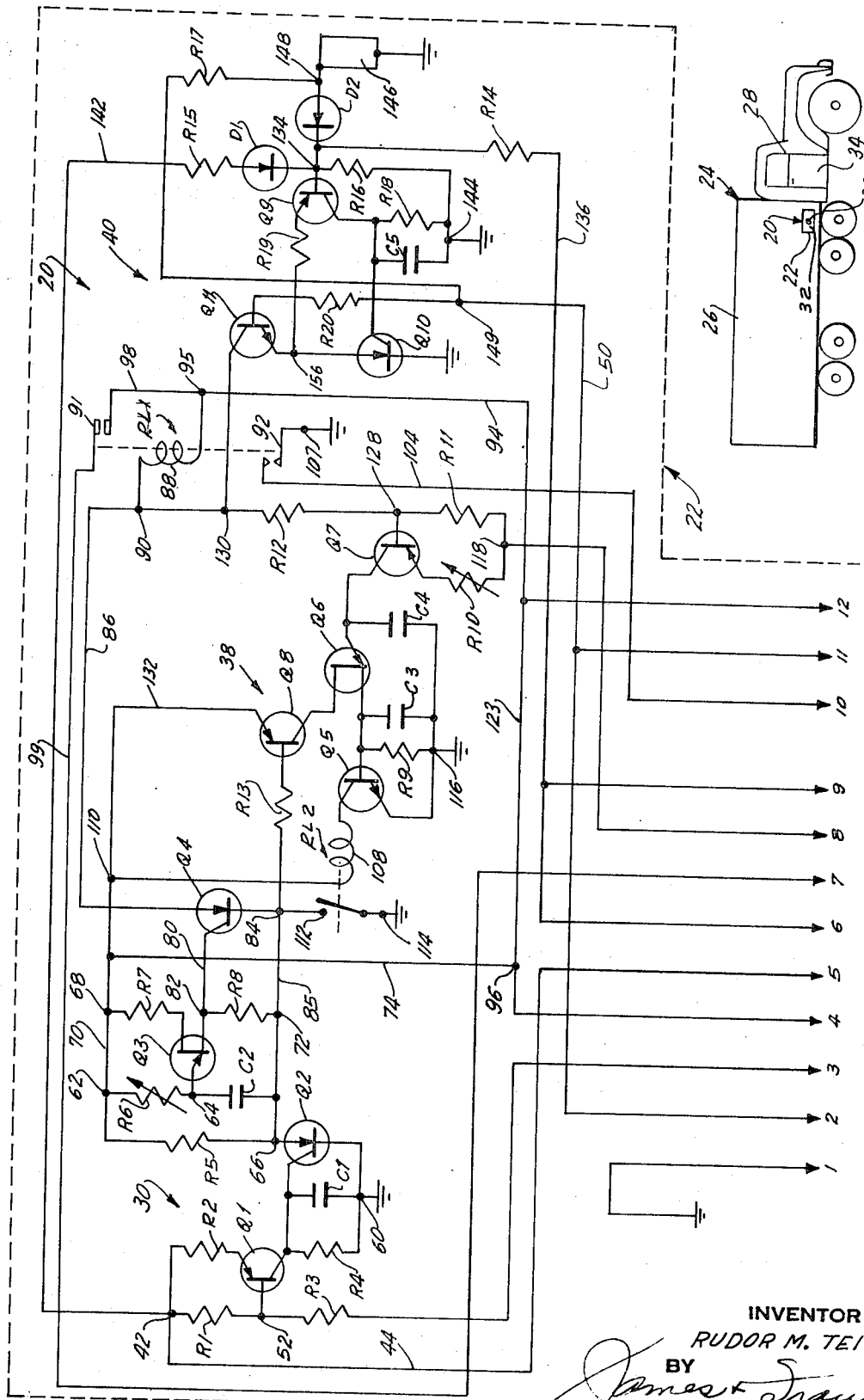

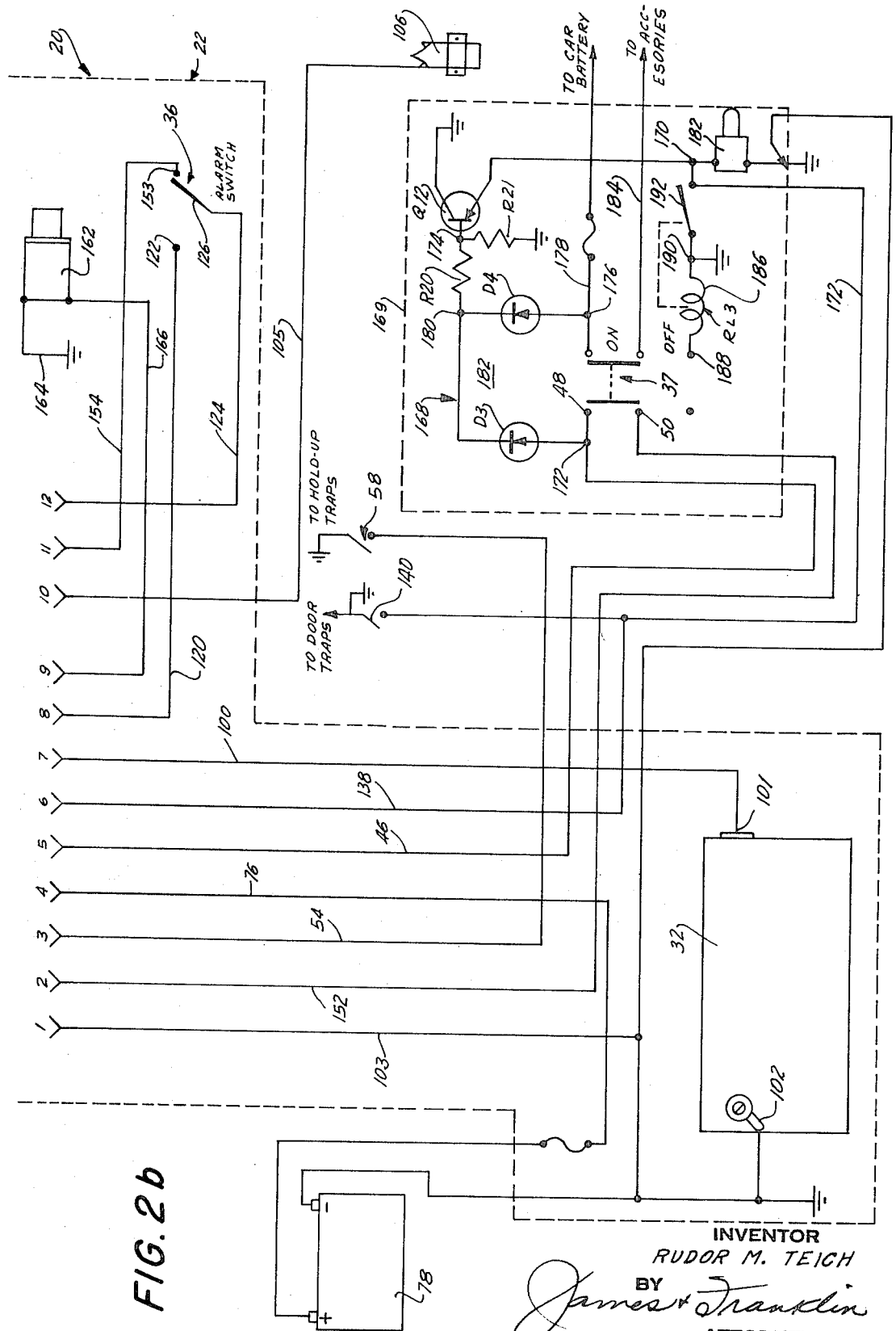

VEHICLE HOLDUP AND THEFT ALARM

The present invention relates to warning systems, and particularly to a theft and holdup warning system for use on vehicles such as trucks, automobiles, tractors and the like.

The occurrence of theft of merchandise from trucks has reached alarming proportions as the use of trucks for carrying merchandise in local and interstate shipment has increased. The capacity of such trucks has also increased so that the value of merchandise carried in a given shipment may be, and often is, considerable. This has created significant problems to law enforcement officials and to owners and drivers of merchandise-carrying trucks. The value of merchandise stolen yearly from trucks and automobiles runs into the millions of dollars, and as a result, insurance rates and thus shipping rates have markedly increased.

While the majority of thefts from trucks occur when the truck is unattended, many crimes involving trucks are holdups or hijacking operations. In the latter crimes, which usually occur on an open, relatively deserted highway, the driver is forced, often at gunpoint, to stop the truck and climb out of his cabin. The hijackers then commonly force the driver into a nearby accessory automobile in which he is driven away from the scene of the crime, and then released. While the driver is being driven away from his truck, the other hijacker or hijackers drive the truck to a warehouse where the hoods in the truck are unloaded and transferred to a different carrier. The hijacked, now empty, truck is then transferred to a location remote from the warehouse where it is usually eventually recovered. However, by this time the damage has been done—the goods have been stolen.

While theft of merchandise is a cause of great concern, an even greater concern is for the safety of the driver involved in a truck hijacking operation, in which, as indicated above, the culprits are often armed with guns. Holdup alarm systems of the type having the capability to produce a warning and to disable the vehicle when a holdup occurs are known. In these systems the opening of the cab door to forcibly remove the driver causes the alarm to sound. The sound of the alarm and the frustration of the hijacker when he finds that he is unable to move the vehicle, may cause the hijacker to act irrationally and to wound or even kill the driver. Moreover, in the known systems, the alarm, once energized, can be quickly shut off if the hijacker should gain possession of the alarm key from the driver. The alarm may thus be energized for too brief a period to attract the attention of law enforcement officials, so that the hijacking will go unnoticed.

When the vehicle is unattended, i.e., when the driver leaves the vehicle and removes the key from the ignition switch, an attempt may be made at stealing the merchandise contained in the vehicle by opening the cargo doors and removing that merchandise, all before the driver returns to his vehicle. The thief may also attempt to move the unattended vehicle. When any of these attempts at larceny are made on an unattended vehicle it is highly desirable that an alarm be sounded and the vehicle's motor stalled (if the attempt is made to move the vehicle) substantially instantaneously with the initiation of the attempted theft, thereby to attract the attention of the driver as well as any nearby law enforcement officer who may be within hearing range of the alarm. Moreover, the would-be thief should not be able to disable the alarm either prior to or during the commission of a theft.

There are other possible unauthorized acts which may be performed by the thief in the commission of a crime involving an unattended vehicle. These include cutting the line from the battery to the ignition switch, jumping the ignition assembly wires, tampering with the alarm, and opening the cargo doors or hood of the truck. For optimum effectiveness to prevent the theft of goods from an unattended vehicle, the alarm should be reliably energized by all these acts. The known theft alarm systems generally satisfy some of the requirements for such systems but they have not adequately met one or more of these requirements and have, as a result, not been accepted by the industry in a manner compatible with the ever increasing need for such systems.

For example, a would-be thief may attempt to start the engine of the vehicle by jumping the ignition wires to bypass the ignition switch. This procedure does not actuate the known alarm systems and thus enables the thief to jump the wires and start the motor with impunity. Moreover, the known vehicle alarms commonly require the driver to actuate the alarm system when he leaves the vehicle and to deactuate it when he returns to the vehicle. The driver may readily forget to perform the required operation and by so doing loses all possible benefits of the alarm.

It is thus an object of the present invention to provide a holdup alarm system for a vehicle in which the danger to the driver of the vehicle is minimized.

It is a further object of the present invention to provide a holdup alarm and prevention system in which the energization of the alarm is delayed to enable the driver to be removed from the vehicle before the alarm is energized, and in which the alarm cannot be immediately silenced even if the thief should forcibly gain possession of the alarm key from the driver.

It is yet a further object of the present invention to provide a holdup alarm for use on a vehicle in which the system is operated by a single key which may be that key used to operate the vehicle's ignition system.

It is yet another object of the present invention to provide an alarm system for use on a vehicle in which the alarm system is always positively enabled when the vehicle is in operation.

It is still a further object of the present invention to provide a theft and holdup alarm system for use in a vehicle, which utilizes solid-state circuitry, is reliable in use, and offers maximum protection to the driver and to the merchandise in the vehicle.

It is still another object of the present invention to provide an alarm system for a vehicle which provides protection against the theft of goods from or movement of an unattended vehicle, and against most, if not all, anticipated unauthorized acts that may be committed on the vehicle by a would-be thief.

To these ends the present invention provides a theft and holdup alarm system for a vehicle which, when the vehicle is unattended, produces a substantially instantaneous alarm when an attempt is made either to move the vehicle or remove merchandise therefrom, and when the vehicle is in operation, produces a delayed alarm whenever an attempt is made to hold up or hijack the vehicle. In both conditions, the actuation of the alarm is also effective to stall the vehicle to prevent the further unauthorized movement thereof.

The actuation of the holdup alarm is delayed by a predetermined time from the initial holdup act, e.g., the unauthorized opening of the cab door while the driver is in the cab, to minimize the danger to the driver who, by the time the alarm is sounded, will be removed from the scene of the holdup. Once the alarm is given it cannot be terminated immediately even if the thief should forcibly obtain the alarm key from the driver. If that key is obtained and used to turn the alarm switch off, the alarm will continue to sound for a predetermined time thereafter, until it is disabled to call law-enforcement officers to the scene of the crime. This will more likely than not frustrate and unnerve the would-be hijacker and cause him to flee from the vehicle before he has had the opportunity to remove the merchandise therefrom.

The alarm disabling circuit is enabled by the operation of a key which is preferably the same key used to actuate the ignition system. Once that key is used to start the motor the alarm switch must be in the on condition. That switch can thus be turned off only be removing the key from the ignition switch and then using the key to turn the alarm switch off. However, as described above, the holdup alarm, once it is initiated, will not immediately shut off even when the alarm switch is turned off, but will continue to sound for a predetermined period of time thereafter.

The theft alarm for the unattended vehicle is actuated when any one of a number of unauthorized acts is committed on the vehicle when the driver is absent from the cabin and the ignition key is removed. These unauthorized acts may include moving the vehicle, cutting the 12-volt line from the battery to the ignition assembly, jumping the ignition assembly, tampering with he alarm box, and opening any of the protected (e.g., cargo) doors, or hood.

The substantially instantaneous actuation of the alarm upon the cutting of the 12-volt battery wire (when the ignition switch is off) defeats the intentions of the thief to disable the alarm before he attempts to jump the ignition wires. As a result this common ploy used by thieves to avoid detection (the cutting of the battery wire) is frustrated by one feature of the alarm system of the present invention.

To the accomplishment of the above and to such other objects as may hereinafter appear, the present invention relates to a vehicle theft and holdup alarm system, as defined in the appended claims and as described in the specification, taken together with the accompanying drawings, in which:

FIG. 1 is a side elevation of a truck provided with the alarm system of the present invention; and FIGS. 2a and 2b are two sections of a schematic circuit diagram of the alarm system.

The vehicle alarm system of the present invention generally designated 20 is preferably housed in a heavy gauge metal housing 22 secured in any appropriate manner to a vehicle such as a truck 24 as shown in FIG. 1. Alarm system 20 provides a warning and protection against the theft of merchandise from the cargo-containing area or van 26 of truck 24 when the vehicle is unattended, and against the hijacking of the vehicle and the merchandise contained therein when the vehicle is being driven by a driver who may be seated in a cab 28.

The hijack alarm section 30 (FIG. 2a) of alarm system 20 comprises means effective to delay the operation of an alarm or siren 32 (FIG. 2b) by a predetermined length of time after the occurrence of an unauthorized act on the operated vehicle such as the opening of the cab door 34 by the holdup man. The time delay in the actuation of alarm 32 permits the driver of the vehicle to be safely removed therefrom before the alarm is sounded. Once the alarm is sounded, it cannot be turned off until after the passage of a second predetermined time even if the hijacker should forcibly or otherwise gain possession of the alarm key from the driver to turn off an alarm switch 36 located in alarm housing 22 and thus accessible from the exterior of vehicle 24. Moreover, the turning off of switch 36 does not immediately disable alarm 32, but rather enables an alarm disabling circuit 38 which deenergizes (i.e., turns off) alarm 32 after the passage of a second predetermined period of time. The inability of the hijacker to immediately deenergize alarm 32 by the turning off of switch 36 is not anticipated by the hijacker. He must then either remain with the vehicle and risk being apprehended by a law enforcement officer attracted by the sound of the alarm, or he may become flustered and disoriented and flee from the vehicle before he has had the opportunity to remove the merchandise therefrom.

The unattended theft alarm section generally designated 40 (FIG. 2a) is effective to sound or energize alarm 32 when any one of several unauthorized acts (such as the opening of the doors of van 26) is performed on vehicle 24 when it is unattended. The alarm switch 36 may be, and is herein specifically described, as operable by the same key, i.e., the ignition key, used to operate the vehicle. Alarm switch 36 is normally in the "on" condition and can only be operatively moved to the "off" position by the operation of that key. Thus, when vehicle 24 is being driven or when the driver removes the ignition key and leaves the vehicle unattended switch 36 must be in the "on" condition. When the ignition switch 37 is off, (and alarm switch 36 is on) theft alarm section 40 is enabled. When the ignition switch 37 is on, hijack alarm section 30 is enabled and the theft alarm section 40 is disabled. The effect of turning off alarm switch 36 when the ignition switch 37 is off is to disable the theft alarm section 40. When ignition switch 37 is on and the alarm is sounded, the effect of turning alarm switch 36 off is the enabling of disabling circuit 38 which turns off alarm 32 only after the alarm sounds for a predetermined length of time.

HIJACKING ALARM SECTION 30

The alarm circuitry is shown in the schematic diagrams of FIGS. 2a and 2b, in which terminals 1-12 respectively interconnect the circuit points in the two diagrams. Terminal 1 is connected to a reference point such as ground, and the connections of terminals 2-12 are described below in context with their associated circuit connections.

Hijack section 30 comprises a PNP-transistor Q1 having a base connected through resistor R1 to a point 42 which in turn is connected to the emitter of transistor Q1 through a resistor R2. Point 42 is connected by a line 44 to terminal 5 which is connected through a line 46 to one contact 48 of ignition switch 37. The base of transistor Q1 is connected through a resistor R3, connected to resistor R1 at a point 52, to terminal 3 which in turn is connected through a line 54 to one contact of a holdup switch 58. The collector of transistor Q1 is connected through a parallel circuit consisting of resistor R4 and capacitor C1 to ground at point 60, and to the gate of a silicon controlled rectifier (SCR) Q2, the cathode of which is returned to ground at point 60. The anode of SCR Q2 is connected through a resistor R5 to a point 62 to which one end of a variable resistor R6 is connected. The other end of resistor R6 is connected to a point 64 to which is also connected one terminal of a capacitor C2. The other terminal of capacitor C2 is connected to the anode of SCR Q2 at a point 66. Point 64 is also connected to the emitter of a unijunction transistor Q3 having a base 1 connected through resistor R7 to a point 68 which in turn is connected by a line 70 to point 62, and a base 2 connected through a resistor R8 to a point 72. Point 68 is connected by a line 74 to terminal 4 which in turn is connected by a line 87 to an alarm voltage source or battery 78. As a result a 12-volt signal is always present at terminal 4 and thus at points 62 and 68. Base 2 of transistor Q3 is also connected by a line 80, which forms a junction point 82 with resistor R8, to the gate of an SCR Q4, the cathode of which is connected to a point 84 and by a line 85 to the anode of SCR Q2. The anode of SCR Q4 is connected by a line 86 to one end of a winding 88 of an alarm relay RL1 at a point 90. Relay RL1 has two sets of normally open contacts 91 and 92. The other end of winding 88 is connected to a line 94 at a point 95, line 94 in turn being connected to terminal 4 and line 74 at a point 96. The 12-volt signal from battery 78 is thus applied by line 94 to point 95 of winding 88 and by a line 98 to one of the contacts of contact pair 91. The other contact of contact pair 91 is connected by a line 99 to terminal 7 which in turn is connected by a line 100 to terminal 101 of alarm 32. The other terminal 102 of alarm 32, as well as the negative terminal of battery 78, are connected by a line 103 to terminal 1 and thus to ground. One of the contacts of contact pair 92 is connected by a line 104 to terminal 10 which in turn is connected by a line 105 to the distributor coil 106 of vehicle 24. The other contact of contact pair 92 is connected to ground at point 107.

In operation, the turning on of ignition switch 37 supplies a 12-volt signal at contact 48 and thus to terminal 5 and point 42, to establish, through resistors R1 and R2, a bias condition at the base of transistor Q1 to normally keep that transistor in a nonconducting or off state. However, if switch 58 is closed by a holdup or hijacking act, such as the opening of cab door 34 by the hijacker, terminal 3 becomes connected by line 54 and the now closed contacts of switch 58 to ground, thereby to connect point 52 and thus the base of transistor Q1 to ground. This has the effect of rendering transistor Q1 conductive which in turn develops a suitable potential across resistor R4 which when applied to the gate of SCR Q2 renders the later conductive, it being recalled that a 12-volt signal is present at the anode of SCR Q2 at point 66 from battery 78. As current now begins to flow from point 62 through resistor R5 and the conductive cathode-anode circuit of SCR Q2, it also begins to flow through the series circuit of resistor R6 and capacitor C2 connected in parallel with resistor R5 between points 62 and 66, thereby to charge capacitor C2 towards a 12-volt level.

When, after a predetermined time interval, which is proportional to the charging time constant of resistor R6 and capacior C2, the charge potential of capacitor C2 reaches a specified critical level, the emitter of unijunction transistor Q3 is forward biased to trigger that transistor into condition. Current then flows in the emitter base 2 circuit of transistor Q3 and thus through resistor R8 and through the conducting anode-cathode circuit of SCR Q2 to ground, thereby to cause a rise in the potential at point 82. That potential is applied to the gate of SCR Q4 and is effective to render the latter conductive. When SCR Q4 is conductive, point 96, at which 12 volts is present, is connected to ground through relay winding 88, line 86 and the conductive anode-cathode circuits of SCR Q4 and SCR Q2. That current flow through winding 88 energizes relay RL1 and closes the contacts of contact pairs 91 and 92. The closing of the former applies the 12-volt signal to the motor of alarm 32 and actuates the alarm, while the closing of the latter connects the distributor coil 106 to ground and thus disables the motor of vehicle 24. Thus the operation of hijack section 30 of alarm system 20 has the dual effect when it is actuated of actuating alarm 32 and disabling the vehicle.

The energizing of relay RL1 does not occur immediately with the closing of holdup switch 58, but rather occurs at a predetermined time thereafter corresponding to the time required to charge capacitor C2 at point 64 to a potential level at which unijunction transistor Q3 is triggered after switch 58 is closed and transistor Q1 and SCR Q2 are turned on. That time may be accurately predetermined when the circuit alarm system is installed in the vehicle by the proper selection of the values of resistor R6 and capacitor C2. A typical initial alarm delay is 3 minutes, but may be modified as desired. Once the holdup occurs, i.e., when switch 58 is closed, there is nothing that can prevent alarm 32 from sounding once that predetermined time has passed even if ignition switch 37 is thereafter turned off to remove the 12-volt signal from point 42. SCR Q2 remains conductive since the 12-volt signal from battery 78 is still present at its anode at point 66 even though the triggering signal at its gate is removed. Alarm 32 will thus continue to sound until alarm switch 36 is closed or set to its "off" position by the operation of the ignition key and even this operation does not immediately disable alarm 32 due to the operation of alarm disabling circuit 38.

Disabling circuit 38 comprises an NPN-transistor Q5 having a collector connected through a winding 108 of a relay RL2 to a point 110 on line 70. Relay RL2 comprises a single normally open contact pair 112, one contact of which is connected to point 84 and the other contact of which is connected to ground at 114. The emitter of transistor Q5 is connected to ground at 116 and the base of that transistor is connected to ground through the parallel pair of resistor R9 and capacitor C3. The base of transistor Q5 is also connected to base 1 of a unijunction transistor Q6, the emitter of which is connected to a capacitor C4 and to the collector of a PNP-transistor Q7. The emitter of transistor Q7 is connected through a variable resistor R10 to a point 118 which in turn is connected to terminal 8, that terminal that terminal in turn being connected by a line 120 to the off contact 122 of alarm switch 36. Terminal 12 is connected by a line 123 to point 96 to which the 12-volt signal is supplied from battery 78, and by a line 124 to the movable contact 126 of alarm switch 36. Point 118 is also connected to the base of transistor Q7 through a resistor R11 at a point 128 which in turn is connected to one end of a resistor R12. The other end of resistor R12 is connected to one end of winding 88 at point 130.

Base 2 of unijunction transistor Q6 is connected to the collector of a PNP-transistor Q8, the base of which is connected to one end of a resistor R13, the other end of which is connected to point 84. The emitter of transistor Q8 is connected by a line 132 to point 110 on line 70.

When alarm switch 36 is turned off, contact 122 and terminal 8 receive the 12-volt signal which is thus applied to point 118 at the junction of resistors R10 and R11.

Prior to the energization of RL1 (and thus of alarm 32) when alarm switch 36 is in its on condition as shown in FIG. 2b, point 130 is floating at 12 volts and point 118 is connected to the open contact 122 of that switch. As a result transistor Q7 is biased to a nonconductive condition. When relay RL1 is energized to sound alarm 32, point 130 is connected through line 86 and the conducting SCRs Q4 and Q2 to ground. When alarm switch 36 is turned off, terminal 12, which is connected to terminal 4 and thus to battery 78, is connected by lines 120 and 124 to terminal 8 and thus to point 118 so that a 12-volt signal is applied to point 118. Resistors R11 and R12 act as a voltage divider to establish a suitable bias at the base of transistor Q7 to render that transistor conductive. Thus, two conditions, i.e., the energization of alarm 32 and the turning off of the alarm switch 36 are required to turn transistor Q7 on and when this occurs current flows through resistor R10, the emitter-collector circuit of transistor Q7, and capacitor C4 to ground at point 116, and the potential at capacitor C4 will then charge up toward 12 volts. When the potential at capacitor C4 reaches a specified level, unijunction transistor Q6 is fired to rapidly discharge capacitor C4 to ground through its emitter base 2 circuit. As a result, a positive going pulse is generated at capacitor C3 and at the base of transistor Q5 which pulse is amplified and shaped by transistor Q5 to cause current to momentarily flow in the emitter-collector circuit thereof and thus through winding 108 of relay RL2. Relay RL2 is thus energized for a brief period and contact 112 is momentarily closed, thereby to momentarily connect point 66— the anode of SCR Q2 to ground which in turn turns off SCR Q2. When relay RL2 is then deenergized after its brief period of energization, contact 112 once again opens. As SCR Q2 is at this time nonconductive, there is no longer a path to ground for the anode-cathode circuit of SCR Q4 so that it too becomes nonconductive. This in turn opens the conduction path to ground for winding 88 of RL1 and that relay is then deenergized and alarm 32 is disabled as desired.

It is to be noted that transistor Q6 is triggered on and relay RL2 is energized only after a predetermined time following the occurrence of both events that cause transistor Q7 to be conductive, i.e., the energization of alarm 32 and the turning off of alarm switch 36. That time delay is determined by the time required for the potential on capacitor C4 to reach a sufficient level to trigger transistor Q6, that time being determined by the time constant of the charging circuit consisting of resistor R10, capacitor C4 and the emitter-collector resistance of transistor Q7. That time may be varied by varying resistor R10 and may typically be set in the range from 3 minutes to a half hour or more as desired.

Transistor Q8 has its emitter-collector circuit connected in series between point 110 at which 12 volts is present at all times, and base 1 of unijunction transistor Q6. Transistor Q6 is thus biased for potential condition only when transistor Q8 conducts and is effective to apply the 12-volt signal from point 110 to base 1 of transistor Q6. Transistor Q8 conducts only when SCR Q2 is conductive to provide a path to ground for the base of transistor Q8. Biasing voltage is thus supplied to base 1 of transistor Q6 only during the time that SCR Q2 is conductive—i.e., when hijack section 30 is operative. At all other times there is no emitter leakage current through transistor Q6 as its base 1 receives no bias voltage. Thus the provision of the normally nonconductive transistor Q8 prevents the drain of current from alarm battery 78 through transistor Q6 at all times other than when the hijack section 30 is operative.

THEFT ALARM SECTION 40

The theft alarm section 40 is potentially operative only when ignition switch 37 is turned off and the alarm switch 36 is turned to its on condition shown in FIG. 2b. It is actuated upon the occurrence of one of a series of events that initiate circuit operation and which in turn substantially instantaneously actuates alarm 32. The theft alarm section 40 comprises a transistor Q9 having a base connected to a point 134 which in turn is connected to one end of a resistor R14 the other end of which is connected by a line 136 to terminals 6 and 9. Terminal 6 is connected by a line 138 to the normally open contact of a door trap switch 140 which may be operated, for example, by the opening of one of the cargo doors of vehicle 24 by a would-be thief. When switch 140 is so operated line 138 is connected to ground. As will be described, when that occurs transistor Q9 os rendered conductive and the alarm 32 is actuated.

Point 134 is also connected to the cathode of a diode D1, the anode of which s connected through a resistor R15 and a line 142 to point 42 at which 12 volts is applied only when the ignition switch 37 is turned on. So long as the ignition switch 37 is turned on there will be a positive bias voltage at the base of transistor Q9 and that transistor will be positively maintained in a nonconducting condition to prevent the operation of theft section 40.

A resistor R16 is connected between point 134 and ground at a point 144, and a diode D2 is connected between point 134 and one contact of a normally open motion-sensitive switch 146. The other contact of switch 146 is connected to ground. A resistor R17 is connected between a point 148, defined at the junction of the anode of diode D2 and switch 146, and a point 149. Point 149 in turn is connected by a line 150 to terminals 2 and 11. Terminal 2 is connected by a line 152 to one contact of the ignition switch 37 and terminal 11 is connected to the normally closed contact 153 of alarm switch 36 and thus has 12 volts applied thereto when the alarm switch 36 is in its on condition. That 12-volt signal is steered by diode D2 to the base of transistor Q9 and maintains that transistor in a nonconductive state even if the ignition switch 37 is turned off as is required for the operation of section 40. Diode D1 prevents the 12-volt signal from terminal 2 from being connected to point 42 at hijack section 30. As a result section 30 remains inoperative as desired, until the ignition switch is turned on.

The collector of transistor Q9 is connected through a parallel circuit consisting of resistor R18 and capacitor C5 to ground at point 144 and to the gate of an SCR Q10. The anode of SCR Q10 is connected to a point 156 which is connected to the emitter of an NPN-transistor Q11 and to one end of a resistor R19, the other end of which is connected to the emitter of transistor Q9. The cathode of SCR Q10 is connected to ground. The base of transistor Q11 is connected through a resistor R20 to point 149 and the collector of transistor Q11 is connected to point 130 and to the winding 88 of relay RL1.

The 12-volt signal present at terminal 11 and line 150 is applied to the base of transistor Q11 to turn that transistor on. When transistor Q11 is conducting a positive voltage is applied to the emitter of transistor Q9 and to the anode of SCR Q10. One condition that is effective to initiate the operation of section 40 is the movement or rocking of the vehicle which causes switch 146 (which may conveniently be a mercury-type switch) to close, thereby to connect point 148 and thus the base of transistor Q9 to ground through its closed contacts. This has the effect of rendering transistor Q9 conductive and causes current to flow through resistor R18 and a voltage to rapidly build up at the gate of SCR Q10. That is sufficient to render SCR Q10 conductive and thus a conducting path is defined from point 130 to ground through the conducting collector-emitter circuit of transistor Q11 and the conducting anode-cathode path of SCR Q10. Since 12 volts is present at point 96 and thus at one end of winding 88 at point 95, current will flow from point 95 through winding 88 and through transistor Q11 and SCR 10 to ground. Relay RL1 is thus energized and alarm 32 is actuated or sounded as described above. When the ignition switch is on, switch 146 is inoperative to actuate alarm 32 as diode D2 blocks the 12-volt signal at point 134 from conduction to ground even if switch 146 is actuated and its contacts closed.

If switch 140 is closed, such as by the opening of the cargo doors or hood of the vehicle or any other operation on the vehicle which may be designed to be effective to actuate that switch, the base of transistor Q9 is connected to ground through lines 136 and the contact of switch 140. Transistor Q9 is thus rendered conductive, SCR Q10 is triggered on in the manner described above, relay RL1 is energized, and alarm 32 is actuated. There may be, as shown in FIG. 2b, a tamper switch 162 positioned in housing 22 adjacent alarm switch 36. That switch has one contact connected to ground at 164 and a second contact connected to terminal 9 through a line 166. Terminal 9, as stated above, is connected to line 136 and to the base of transistor Q9. When an attempt is made to tamper with alarm housing 22, switch 162 is actuated to connect terminal 9 and thus the base of transistor Q9 to ground, thereby causing operation of theft section 40 and the ensuing action of alarm 32 in the manner described above.

The thief attempting to move an unattended vehicle may do so without the use of the ignition key by jumping the wires between the car battery and the ignition circuit wires which, as described below, will cause alarm 32 to be actuated. The sophisticated thief may learn that by jumping the wires he will actuate alarm 32 and may attempt to deactuate the alarm by first cutting the wire from the car battery and then jumping that wire to the ignition circuit. In this manner he hopes to avoid detection. To prevent the thief from so disabling the alarm, the system of the present invention comprises an additional ignition alarm section generally designated 168 preferably housed in a box 169 which may be located within the interior of cab 28. Section 168 is effective to actuate the alarm 32 upon the cutting of the battery wire even before the thief has had the chance to jump the battery and ignition wires.

Section 168 comprises a PNP-transistor Q12 having its collector connected to ground and its emitter connected to a point 170 which in turn is connected through a line 172 to line 138 and thus to terminal 6. The base of transistor Q12 is connected to a point 174 defined at the junction of one end of resistors R20 and R21. The other end of resistor R21 is connected to ground. Resistors R20 and R21 define a voltage divider which establishes a bias at the base of transistor Q12 effective to normally maintain that transistor nonconductive. A diode D3 has an anode connected to the contact 48 of the ignition switch 37 at point 172, and a second diode D4 has an anode connected at a point 176 to a wire 178 leading from the car battery (not shown). The cathodes of diodes D3 and D4 are connected at a point 180 to resistor R20. Diodes D3 and D4 thus define along with transistor Q12 an AND-logic-circuit 182. As long as a positive or 12-volt signal is present at the anodes of either diode D3 or diode D4 that circuit is effective to maintain transistor Q12 in a nonconductive state. Transistor Q12 conducts only when neither of diodes D3 or D4 has a positive signal applied thereto. This situation occurs only when the ignition switch 37 is turned off to remove the 12 volts from the anode of diode D3, and the battery wire 178 is cut to remove the 12 volts from the anode of diode D4. At that time transistor Q12 is rendered conductive and terminal 6 is connected to ground through lines 138, 172 and the emitter-collector circuit of transistor Q12. As terminal 6 is connected to the base of transistor Q9 in section 40 the actuation of transistor Q12 thus operatively connects the base of transistor Q9 to ground, thereby causing transistor Q9 to be turned on and alarm 32 to be actuated in the manner described above.

A tamper switch 182 may be connected to point 170 and is actuated to connect point 170 to ground when an attempt is made to tamper with housing 169. When that occurs point 170 and thus terminal 6 are connected to ground, transistor Q9 is rendered conductive and alarm 32 is actuated.

The provision of diode D3 in the AND-logic-circuit 182 enables the vehicle's battery to be serviced without sounding the alarm 32 simply by placing the ignition switch 37 in the on condition so that diode D3 receives a 12-volt signal and transistor Q12 is maintained in its off condition to prevent actuation of alarm 32 even though the battery is removed from the vehicle at that time.

The thief may also attempt to start the motor of vehicle 24 without the use of the ignition key by jumping wire 178 to a wire 184 which is connected to the electrically operated accessories in the vehicle. For this reason a third relay RL3 is provided. It has a winding 186 connected between a point 188 and ground at point 190. When the ignition switch 37 is turned off, point 188 is connected to wire 184 and if an attempt is then made to jump the battery wire 178 with wire 184 a high current will flow through winding 186 to ground and energize relay RL3. When that occurs relay contact 192 closes and connects point 170 to ground which, as described above, renders transistor Q9 conductive and actuates alarm 32. The relatively high current flowing through winding 186 to ground when this occurs may also cause a flurry of sparks which further distresses and confuses the would-be thief.

In a typical operating circuit of the alarm system the following components were utilized:

| | | | |
|---|---|---|---|
| C1 | 0.47 µf. | R15 | 1K Ω |
| C2 | 1000 µf. | R16 | 33K Ω |
| C3 | 20 µf. | R17,R18,R19 | 1K Ω |
| C4 | 1000 µf. | R20 | 2.2K Ω |
| C5 | 0.47 µf. | R21 | 33K Ω |
| R1 | 10K Ω | Q1 | 2N3639 |
| R2, R3 | 1K Ω | Q2 | 2N1595 |
| R4, R5 | 470 Ω | Q3 | 2N4871 |
| R6 | 150K Ω | Q4 | 2N5060 |
| R7 | 100 Ω | Q5 | 2N3900 |
| R8 | 27 Ω | Q6 | 2N4871 |
| R9 | 100 Ω | Q7, Q8, Q9 | 2N3639 |
| R10 | 10K Ω | Q10 | 2N5060 |
| R11 | 2.2K Ω | Q11 | 2N1613 |
| R12,R13 | 15K 106 | Q12 | 2N3639 |
| R14 | 2.2K Ω | D1-D4 | 1N4001 |

The alarm system 20 of the present invention thus provides a warning when an unauthorized act is committed upon the vehicle when the vehicle is in either of its two basic conditions. The first of these conditions is when the vehicle is unattended, that is, the driver has left the cabin and removed the ignition key from the vehicle. Any act upon that unattended vehicle which indicates an attempted theft of that vehicle or the merchandise carried therein is immediately effective to actuate an alarm and to disable the vehicle. Such an act may be the opening of the cab or cargo doors, the cutting of the battery wire, the moving of the vehicle, or the jumping of the battery wire to an accessory wire. It is apparent that the theft alarm system may be readily modified to permit the actuation of transistor Q9 and thus of alarm 32 by any other theft-associated acts that may be committed on the unattended vehicle.

The second of these conditions is the hijacking or holdup of the vehicle which occurs when the driver is in the cabin and the ignition switch is turned on. The would-be hijacker forces the driver, usually at gun point, to stop the vehicle. As soon as a further step is taken by the thief, such as the opening of the cab door, the alarm system is initiated but is not immediately effective to actuate the alarm. Instead, a delay circuit is energized to give the driver the opportunity to be removed from the vehicle prior to the sounding of the alarm so as to prevent harm to the driver by a precipitous act of the hijacker which may be caused by the sounding of the alarm while the driver is still in the vehicle. The alarm once initiated cannot be prevented from sounding even if the thief should forcibly gain possession of the alarm key and turn off the alarm switch. The alarm will still continue to sound for a predetermined period after it is actuated and the then confused and frustrated hijacker will either flee from the vehicle fearing detection and apprehension, or he will become sufficiently flustered by the continuing sounding of the alarm to cause him to leave the vehicle before he has had the opportunity to remove any of the merchandise therefrom. Thus maximum protection is provided to both the driver and the merchandise carried in the vehicle by the alarm system of the resent invention.

As the key used to operate the alarm switch is the same as that used to operate the ignition switch of the vehicle, the alarm is in a potentially energized condition at all times while the vehicle is being operated, and may be turned off only by a positive act of the driver by the use of that ignition switch when the vehicle is unattended. As a result the alarm system of this invention is ready for operation without the need for the driver taking a positive step to actuate that system prior to his leaving the vehicle unattended or when he is driving the vehicle.

The alarm system of the present invention thus provides optimum protection to both driver and merchandise in a reliable and efficient manner by a system which requires the use of relatively inexpensive and reliable components. These components are contained in a rugged housing to prevent the system from being tampered with by the would-be thieves prior to an attempted theft of the vehicle. Furthermore, means are provided to actuate the alarm as a result of such tampering.

While only a single embodiment of the present invention has been herein disclosed, it is apparent that many variations may be made thereto without departure from the spirit and scope of the invention.

I claim:

1. An alarm system for providing an indication of the unauthorized use of a vehicle, said system comprising means effective to sense the unauthorized use of the vehicle and to establish an alarm signal in response thereto, means operatively connected to said sensing means and effective when said alarm signal is established to produce an actuating signal delayed in time by a predetermined amount from said alarm signal, alarm means, means operatively connected to said actuating signal producing means and said alarm means, actuated by said actuating signal and effective when so actuated to energize said alarm means, and manually actuatable alarm-disabling means operatively connected to said alarm-energizing means, said alarm disabling means being effective when manually actuated to produce an alarm-disabling signal only after a predetermined time has elapsed, said disabling signal being effective to deactuate said alarm-energizing means, thereby to deenergize said alarm means.

2. The alarm system of claim 1, in which said actuating signal producing means comprises first switch means actuated when an unauthorized use of the vehicle is sensed, second switch means, and circuit means operatively connected between said first and second switch means, and effective to actuate the latter a predetermined time after the actuation of the former.

3. The alarm system of claim 2, in which said alarm-disabling means comprises manually actuatable third switch means, fourth switch means, means operatively connected to and energized by the actuation of said fourth switch means and effective when energized to deactuate said second switch means, and second circuit means operatively connected to said third and fourth switch means and effective to actuate the latter a predetermined time after the actuation of the former.

4. In the alarm system of claim 1, means for actuating said alarm-disabling means which comprises switch means actuatable by the ignition key used to operate the vehicle, said actuating means being inoperative so long as said ignition key is in position to operate the vehicle.

5. An alarm system for use in a vehicle for providing a warning of either the theft of merchandise from the vehicle when the vehicle is unattended, or the holdup of the vehicle when the driver is in the vehicle, the vehicle comprising a driver's compartment having a normally closed first door, a merchandise compartment having a normally closed second door, a power supply, and first and second alarm circuits adapted to be enabled by connection thereof to said power supply, said system comprising alarm means, first switch means operatively connected in said first alarm circuit and effective when actuated and when said first alarm circuit is enabled to substantially instantaneously energize said alarm means, means effective to actuate said first switch means when said second door is opened, second switch means effective when actuated and when said second alarm circuit is enabled to energize said alarm means, and means effective to actuate said second switch means a predetermined time after said first door is opened, and an ignition switch selectively operable between an off condition and an on condition, said ignition switch in its off condition operatively connecting said first alarm circuit to said power supply thereby to enable same and operatively disconnecting said second circuit from said power supply thereby disabling same and in its on condition operatively connecting said second alarm circuit to said power supply thereby enabling same and operatively disconnecting said first alarm circuit from said power supply thereby disabling same.

6. In the system of claim 5, means effective to deactuate said second switch means a predetermined time after it is actuated, thereby to deenergize said alarm means.

7. In the system of claim 5, a conductor normally establishing an electrical connection between said power supply and the ignition switch, second means effective to actuate said first switch means when the ignition switch is in its said off condition and said conductor is broken.

8. The system of claim 7, further comprising third means effective to actuate said first switch means in response to the movement of the vehicle when the ignition switch is in its said off condition.

9. In the system of claim 7, in which the vehicle further includes a second conductor adapted to be operatively connected to one or more electrically operated components in the vehicle and normally disconnected from said first mentioned conductor when the ignition switch is in its said off condition, fourth means effective to actuate said first switch means upon the connection of said second conductor to said first conductor when the ignition switch is in its said off condition.

* * * * *